United States Patent Office
3,701,666
Patented Oct. 31, 1972

3,701,666
PROCESS FOR MAKING AMINO ACID
COMPOSITION
Milton Winitz, Palo Alto, Calif., assignor to Morton-
Norwich Products, Inc., Chicago, Ill.
No Drawing. Filed Feb. 14, 1968, Ser. No. 705,287
Int. Cl. A23l 1/00
U.S. Cl. 99—1
29 Claims

ABSTRACT OF THE DISCLOSURE

A process for making palatable compositions containing all of the essential amino acids necessary for human nutrition. Particular processes are described for making compositions containing combinations of amino acids, carbohydrates and minerals which are palatable to human taste. Processes are also shown for making palatable chemically defined diets for human consumption containing the above plus vitamins and fat as an aqueous emulsion or in dry form.

---

This invention relates to amino acid formulations for human consumption to supply all the essential amino acid requirements, and more particularly to processes for making palatable chemically defined diets for human consumption.

Complete diets require the presence of protein, vitamins, minerals, fats, and a source of calories generally in the form of carbohydrates. Natural foodstuffs, such as meat, fruit, grains, and leafy vegetables provide these constituents. It has long been the aim of nutritionists to develop complete synthetic diets that would incorporate these constituents, and such diets have been indeed developed.

Proteins are high molecular weight, highly complex polymers composed of a variety of the so-called essential and non-essential amino acids. Utilization of protein by the animal organism requires that the protein be degraded by the proteolytic enzymes of the gastrointestinal tract to the constituent individual amino acids because the amino acids can be absorbed through the gastrointestinal tract only in the free, uncombined form. The essential amino acids, of which there are considered to be ten in number (leucine, isoleucine, valine, methionine, tryptophan, phenylalanine, threonine, arginine, lysine, histidine), are a vital requirement of the animal species. For a dietary regimen to be considered adequate for the support of all normal physiological functions, it should contain these essential amino acids in the appropriate levels and in the proper proportion of one to the other. The function of the non-essential amino acids is to provide a source of metabolizable nitrogen required by the animal organism for the biosynthesis of proteins, purines, nucleic acids, and other metabolites. Examples of non-essential amino acids include alanine, cysteine, cystine, glycine, proline, glutamic acid, tyrosine, aspartic acid, and serine. Proper nutritional balance requires that these non-essential amino acids be provided in sufficient quantity and within a range of proportions to each other that is less restrictive or critical than the balance required for the essential amino acids.

Amino acids (except glycine) contain one or more asymmetric centers and thus may exist in two or more stereoisomeric forms. Nutritional experience has shown that only the L-isomer of an amino acid can be utilized by the animal organism and that the animal organism has only a very limited capacity for enzymatically converting some amino acids to the L form from the D form. In addition, an oversupply of D-amino acids can be deleterious and can lead to an inhibition of the normal physiological function. All proteins found in nature contain their constituent amino acids in the L configuration only.

Carbohydrates in a typical dietary regimen are provided in the form of starches, which are high molecular-weight and relatively water-insoluble polymers of glucose. Other sources of carbohydrate, such as lactose (a disaccharide of galactose and glucose) and sucrose (a disaccharide of fructose and glucose), as well as monosaccharides, such as fructose and glucose, occur in natural dietary regimens, but to a much more limited extent. The carbohydrates are employed by the animal organism as a prime source of energy. Prior to utilization by the animal organism, the polymeric or dimeric forms of the carbohydrates are degraded to the constituent monomers by enzymatic action in the gastrointestinal tract in order that they may be absorbed through the gastrointestinal tract.

Lipids typically appear in a natural dietary regimen as fats and oils in the form of triglycerides of three molecules of fatty acids in combination with one molecule of glycerol. The common fatty acids in such triglycerides are those having between 12 and 24 carbon atoms, such as palmitic, stearic, myristic, oleic, linoleic, linolenic, and arachidonic acids. Of these, only linoleic, linolenic, and arachidonic acids have been found to be essential to normal physiological function of animal organisms. The essential fat requirement can be satisfied either by sufficient quantities of linoleic or arachidonic acids, or by combinations of the two, or by linolenic acid in combination with sufficient quantities of either or both of the other two. Degradation of fats prior to absorption through the gastrointestinal tract is accomplished by the enzymatic action of the lipases of the gastrointestinal tract, through which enzymatic action free fatty acids are formed. Other than the essential fats for which there is a vital requirement by the body, fats, like carbohydrates, serve as a source of energy.

Animal organisms have requirements for certain anions and cations of mineral salts, and mineral requirements for certain of the various anions and cations have been established. The ions required in greatest quantity include sodium, potassium, magnesium, phosphorus and chloride ion, whereas other required ions (known as the trace elements), such as iron, manganese, cobalt, copper, molybdenum, zinc, and iodide ion, are required in lesser amounts. Minerals are provided in a natural dietary regimen primarily in the dissociated form (e.g., sodium chloride as the sodium and chloride ions), but they may also occur in the diet in covalent combination with organic molecules (e.g., cobalt in vitamin B-12 and iron in hemoglobin).

Minimum requirements have been established for certain of those vitamins, both water- and fat-soluble, that are known to be necessary for normal physiological function. Vitamins occur in natural dietary regimens either as the free form or combined with other chemical moieties. The water-soluble vitamins include ascorbic acid, thiamine, riboflavin, vitamin B-6, vitamin B-12, pantothenic acid, biotin, inositol, choline, p-aminobenzoic acid; the fat-soluble vitamins include vitamin A, vitamin D, menadione, and tocopherol.

As used in this patent application, the term "defined diet" refers to a diet formulation consisting essentially of highly purified nutrients, essential vitamins, and minerals. If the nutrients of the defined diet are all present in the form of compounds whose precise molecular configuration is known, this defined diet is termed a "chemically defined diet." Nutrients whose precise molecular configuration may not be known and whose inclusion may remove the diet from the chemically-defined-diet category, include, for example, proteins, peptones, starches, dextrins and fats. On the other hand, nutrients whose molecular configurations are precisely known and which may be a part of chemically defined diets include, for example, amino acids and their simple precursors, such as purified peptides, mono- and disaccharides and esters of pure fatty acids.

Various attempts have been made to formulate synthetic diets for human consumption to supply all of the requirements of the essential amino acids and nitrogen needed for growth and substenance of normal physiological activity. Although nutritionally adequate amino acid mixtures containing in addition carbohydrates, fats, minerals, and vitamins have been formulated and have been successfully employed in metabolic and nutritional studies with experimental animals and with humans, long term provision of defined diets to humans has been thwarted by virtue of the unpalatable nature of the diets. Adequate chemically defined diets have also been formulated, and one such diet is described in Nature, vol. 205, No. 4973, pp. 741–743 (Feb. 20, 1965). This diet has also been unpalatable to humans, and its usefulness has generally been limited to experimental projects where the desire of the subjects, as in the furtherance of research, overcame the problem of the unpalatability.

Amino acid formulations which can be incorporated into nutrient compositions containing the other essentials and which will not impart an off-taste or an off-odor thereto have now been developed and are disclosed in my copending patent application entitled "Food Composition," Ser. No. 705,290, filed Feb. 14, 1968, and now abandoned.

It is an object of the present invention to provide an improved process for making a palatable defined diet for human consumption. It is another object to provide an improved process for making palatable aqueous solutions of amino acids which are sufficient to satisfy the essential amino acid requirements in diet formulations for human consumption. A further object is to provide an improved process for making a chemically defined diet that has good storage stability in the solid state or in aqueous solution. These and other objects of the invention will be apparent from the following detailed description of processes embodying various features of the invention.

It is believed that in many instances the unpalatability of previous chemically defined diet compositions has been caused wholly or in part by the chemical breakdown of amino acids and/or by the chemical interaction of various components in the formulation, and not by the inherent nature of the amino acid as was previously erroneously believed. It has been found that an amino acid formulation palatable to human taste can be provided if the ingredients and the conditions of the formulation process are closely regulated, particularly by controlling formulation temperatures and orders of addition in order to minimize the fomulation of amino acid derivatives and the interaction of components therein to form undesirable reaction products. Amino acid derivatives are considered to be products which evolve by decomposition of the amino acids or by interaction of an amino acid with another component of the formulation.

Palatability in an aqueous solution formulation is harmed if the amino acids and any derivatives thereof contribute lower alkyl mercaptan, such as methyl mercaptan, in a total amount greater than about 15 miligrams per liter of solution. If, as is preferably the case, non-essential amino acids are used to supply the metabolizable nitrogen necessary for the human body to perform its natural metabolic functions, then there are two other criteria considered important to preserve the palatability of the formulation. The amino acids and any derivatives thereof should not contain sulfhydryl groups in an amount greater than about 0.05 gram per liter of solution. Also glutamic acid, or alkali metal salts thereof, such as sodium glutamate, should not be present in an amount greater than about 1.43 grams per liter of solution.

Palatable amino acid compositions for human consumption ran be formulated and used in a diet together with carbohydrates, fats, vitamins and/or minerals. The present invention is generally concerned with making such formulations from substantially pure amino acids. However, it is also concerned with the overall process for formulating a substantially complete diet.

By following the foregoing criteria, it is possible to choose the ingredients of a formulation to avoid initially employing amino acids which will cause the limits set forth above to be exceeded, thereby destroying palatability. The amount of sulfhydryl (SH) groups and disulfide linkages (which form SH groups upon reduction in solution by other components, such as ascorbic acid) in the diet is regulated by limiting the amount of such groups added to the formulation in the form of cystine, which contains a disulfide linkage, and cysteine, which contains an SH group. Furthermore, edible commercial grades of methionine possess an off-taste by virtue of the contamination thereof with other impurities, such as lower alkyl mercaptans. Thus, commercial methionine is further purified before its inclusion in a dietary mixture, as by recrystallization from water or a water-ethanol mixture, or from some other suitable solvent or mixture of solvents. Moreover, methionine is subject to thermal degradation, and it has been found that the temperature of the formulation after dissolution of methionine therein should be controlled to prevent such degradation.

Glutamic acid or sodium glutamate, a form in which it is often used, can be incorporated in an amino acid formulation in an amount up to about 1.43 grams per liter without developing a strong characteristic flavor that is so incompatible with the taste of other ingredients in the diet formulation to render the formulation unpalatable. This off-taste problem is obviated by providing nutritionally equivalent glutamine in lieu of glutamic acid.

As previously indicated, the amino acid components of a diet are selected to meet the normal metabolic needs of the human subject and to maintain the desired nitrogen balance. The amino acids can be provided either as the free amino acids or as suitable precursors thereof (such as purified peptones and peptides) which will be converted to free amino acids by the metabolic processes of the human body, or as mixtures of the aforementioned groups. Moreover, as used in this application, the term "amino acid" or "free amino acid" or the named amino acid itself should be understood to also include simple reaction products of the amino acid and another chemical compounds (for example, esters, amides and salts of amino acids) in which nutritionally equivalent forms the amino acids may be employed without detracting from their nutritional utilization.

In chemically defined diets, the amino acid components, in the form of free essential and non-essential amino acids or suitable precursors thereof such as peptides, are provided at total levels sufficient to satisfy normal physiological requirements for nitrogen. Accordingly, the balance among the various amino acids is selected to meet the normal metabolic needs of the human subject and to maintain the desired nitrogen balance. Because of strong interdependencies between the required level of a given amino acid and the level of one or more of the other amino acids present in the diet, it is not practicable to establish a precise range of levels for each of the amino acids. Generally, the ratios of the levels of amino acids in the diets should approximate those of a high quality protein, such as meat, eggs, or milk, for example.

The amino acid content of such materials is set forth in "Amino Acids Content of Foods," M. L. Orr and B. K. Watt, Home Economics Research Report No. 4, Agricultural Research Service, U.S. Dept. of Agriculture, December 1957, available from the Superintendent of Documents, U.S. Government Printing Office, which can serve as a useful guide in the formulation of diets according to this invention. A useful guide in determining minimum protein and amino acid requirements for formulating diets other than those specifically disclosed herein is found in "Protein Requirements," Report of the FAO Committee, Rome, Italy, Oct. 24–31, Food and Agricultural Organization of the United Nations 1957), available from Columbia University Press. However, after due experimentation, preferred ranges of the essential amino acids have been established which are considered to be excellently adapted to supply the metabolic needs of the human species. Table I illustrates a diet formulation containing these essential amino acids at relative levels with respect to one another which are at about the centers of these preferred ranges. Deviation in the amount of any particular essential amino acids with respect to the others in Table I should not be more than plus or minus about 5 percent by weight in order to remain within the preferred ranges. The diet formulation set forth in Table I is entitled a base diet because, if it were to be administered for any substantial length of time, e.g., more than about two weeks, a source of cobalt and molybdenum ions would be added, and the values of folic acid and menadione (Vitamin K) would be increased.

TABLE I

Diet Formulation I (base)

| Amino acids: | G. |
|---|---|
| L-alanine | 1.76 |
| L-arginine·HCl | 3.89 |
| L-aspartic acid | 3.75 |
| L-glutamine | 6.19 |
| Glycine | 2.87 |
| L-histidine·HCl·H$_2$O | 1.08 |
| L-isoleucine | 1.65 |
| L-leucine | 2.61 |
| L-lysine·HCl | 2.45 |
| L-methionine | 1.69 |
| L-phenylalanine | 1.88 |
| L-proline | 2.35 |
| L-serine | 1.21 |
| L-threonine | 1.65 |
| L-tryptophan | 0.51 |
| L-tyrosine ethyl ester·HCl | 2.80 |
| L-valine | 1.82 |

| Minerals: | | |
|---|---|---|
| Acetic acid | mg | 5.95 |
| Calcium chloride·2H$_2$O | g | 2.93 |
| Cupric acetate·H$_2$O | mg | 6.12 |
| Ferrous ammonium sulfate·6H$_2$O | g | 0.070 |
| Magnesium oxide | g | 0.258 |
| Manganous acetate·4H$_2$O | mg | 12.49 |
| Potassium chloride | g | 2.33 |
| Potassium hydroxide | g | 1.27 |
| Potassium iodide | mg | 0.19 |
| Sodium chloride | g | 1.21 |
| Sodium glycero-phosphate·5½H$_2$O | g | 8.13 |
| Sodium hydroxide | g | 1.13 |
| Zinc chloride | mg | 0.85 |

| Water-soluble vitamins: [1] | | |
|---|---|---|
| p-Aminobenzoic acid (K salt) | mg | 354.9 |
| Ascorbic acid | mg | 70.0 |
| d-Biotin | mg | 0.20 |
| d-Calcium pantothenate | mg | 10.0 |
| Choline chloride | mg | 85.0 |
| Folic acid | mg | 0.10 |
| Inositol | mg | 116.5 |
| Niacinamide | mg | 13.3 |
| Pyridoxine·HCl | m | 2.0 |
| Riboflavin phosphate (Na salt) | mg | 1.64 |
| Thiamine·HCl | mg | 1.2 |
| Cyanocobalamin | mcg | 5.0 |

[1] Vitamin levels given represent amounts to be present in finished product.

| Carbohydrates: | G. |
|---|---|
| Glucono-delta-lactone | 6.31 |
| Glucose | 400.5 |

| Fats and fat-soluble vitamins: | | |
|---|---|---|
| Safflower oil [2] | g | 1.33 |
| Vitamin A acetate | mg | 1.72 |
| Vitamin D$_2$ | mcg | 10.0 |
| Alpha-tocopherol acetate | mg | 20.0 |
| Polysorbate 80 (emulsifier) | mg | 66.7 |
| Menadione | mg | 0.12 |

[2] Or equal amount of ethyl linoleate.

Flavoring: Synthetic flavoring agents plus water are added.

The diet formulation in Table I is otherwse considered to be a complete diet which is excellently considered to be a complete diet which is excellently suitable for supplying all the nutrient needs of the human species. In this respect, the formulation is considered to provide, in the weight amounts shown, the complete daily requirements for the average human. The illustrated composition provides a caloric intake of about 1800 calories and metabolizable nitrogen in an amount of about 5.88 grams. The illustrated composition is intended to be administered orally as primarily an aqueous solution, with the fat and fat-soluble vitamins being present as an emulsion therewith. Although the amount of water employed need only be sufficient to solubilize the water-soluble ingredients, it is preferably administered in a more dilute form at a level of about one calorie per milliliter. Such a caloric level is provided by diluting the weight formulation shown with sufficient distilled or deionized water to bring it up to about 1.8 liters.

As previously indicated, the non-essential amino acids provide a source of metabolizable nitrogen. However, in addition, some of the non-essential amino acids can be used as substitutes in part for requirements of the essential amino acids. For example, a portion of the requirement for methionine can be substituted for by either cystine or cysteine and a portion of the requirement for phenylalanine can be substitute for by tyrosine. Moreover, in general there is more latitude in the relative levels of the non-essential amino acids; however, they are preferably provided at the relative levels present in the formulation shown in Table I, plus or minus about 5 percent by weight. It should also be recognized that another source of nonessential nitrogen could be employed, for example, an organic ammonium salt, such as ammonium citrate.

As previously indicated, the carbohydrates in the diet are employed as the prime source of energy, and in the diet illustrated in Table I, the carbohydrates are the primary source of calories. Although carbohydrates may generally be employed in various forms, as also previously indicated, it is considered advantageous to provide as the sole source of carbohydrate in the diet either glucose, maltose, starches, dextrins or mixtures thereof. It has been found that human subjects who consume a defined diet of this type with such a sole source of carbohydrate exhibit a marked reduction in their blood serum cholesterol level, as explained in detail in my copending patent application, Ser. No. 510,778.

It has been found that it is important to closely control the process steps in combining the various ingredients to form such a complete diet, or various portions thereof, in order to prevent degradation of individual ingredients and/or interactions between ingredients which might well give rise to off-tastes. Thus, after appropriately selecting the levels of amino acids to be employed in the formulation in order to avoid inherently incompatible flavors, as previously indicated, highly pure forms of the amino acids are used. Recrystallizations of individual amino acids are carried out if necessary to insure the absence of undesirable trace contaminants. After proper selection is made and adequate purity is obtained, close control of the process conditions is used to assure ultimate palatability.

In general, certain amino acids are not very water-soluble, and such relatively insoluble members are used in the form of the hydrochloride salts and/or esters thereof, which are nutritionally the same. Tyrosine is preferably provided in such forms. In order to promote the dissolution of various of the amino acids in water, the water is usually maintained at a temperature of about 90° C. to 100° C. However, it has been found that two of the amino acids of the formulation are too suceptible to thermal degradation to permit their inclusion into the aqueous solution at such temperatures without seriously harming the efficacy and palatability of the resultant solution. These two ingredients are the essential amino acid tryptophan and the non-essential amino acid glutamine. Tryptophan is extremely susceptible to partial deterioration; and accordingly, before tryptophan is added to the aqueous solution, the temperature of the solution is reduced to at least to about 70° C. and preferably to at least to about 40° C. In general, it is not considered necessary nor practical to reduce the temperature of the solution lower than to about 30° C. Likewise, glutamine is not added to the aqueous solution until the temperature has been lowered as specified above.

Particular carbohydrates from the group of monosaccharides, disaccharides, starches and dextrins, which may be suitably employed have various degrees of water-solubility, and good solubility is desirable in formulating the food composition. Moreover, it has been found that the favorable endothermic heat of solution of carbohydrates, such as glucose, can be employed to achieve the temperature lowering of the solution preparatory to the addition of tryptophan and glutamine while concurrently accomplishing dissolution of a substantial portion of the carbohydrates component in the aqueous solution at temperatures where solubility is greater.

Consideration in the process may also be given to methionine which, as previously indicated, is subject to degradation that results in the creation of lower alkyl mercaptans, particularly methyl mercaptan. The time for which methionine is subjected to the relatively high temperatures may be reduced by adding the methionine just before the temperature lowering is carried out, in which instance it should not be exposed to elevated temperatures for a sufficient period of time to harm palatability.

The non-essential amino acid, aspartic acid, is difficultly soluble in water even at temperatures in the range of about 90° C. to 100° C. However, it has been found that aspartic acid can be fairly readily dissolved in alkaline water having a pH between about 8 and 14. Thus, the dissolution is facilitated by separately dissolving the aspartic acid in alkaline water having a pH of about 8 or above and then adding this pre-solution to the main solution.

Not only are various of the amino acids subject to thermal degradation, as indicated above, but interaction fairly readily occurs at elevated temperature between aldehyde or ketone groups present in the carbohydrate component, such as in glucose, which is the preferred carbohydrate, (or potential aldehyde groups of a glucose-containing polymer subject to hydrolysis) and the amino acids, particularly lysine. Such interaction results in the formation of condensation products which are brown in color and which have a flavor resembling caramel. Precautions should be taken to minimize the extent of the time-temperature integral over which amino acids and such carbohydrates are both present in the solution in order to thereby minimize the extent of caramelization that may occur. This result is achieved most expeditiously by adding the carbohydrate sufficiently rapidly while agitating the solution to enhance its dissolution. In this respect, the addition of the carbohydrate components, such as glucose, should be sufficiently rapid to drop the temperature to about 40° C. within ten minutes time from the initial addition. It should also be understood that not only does rapid dissolution avoid unpalatability resulting from interaction between amino acids and the aldehyde or ketone groups of the carbohydrate, but it is reduces the time at which the methionine is exposed to the relatively high temperatures. Generally, not all of the carbohydrate is added at this time, although it all could be added at this time if one would so desire, and the remainder is dissolved subsequent in the process.

The preferred composition of minerals is provided via the salts and other compounds listed in Table I. Although it is considered that the stated formulation has advantages from a cost standpoint and from ease of formulation, various of the elements could be provided in the form of other suitable compounds. For example, magnesium might be provided in the form of acetate, citrate or chloride. Similarly, the potassium might be provided in the form of bicarbonate or sorbate. Likewise, iron might be provided in the form of chloride, gluconate, acetate or citrate. Calcium may be supplied as acetate, citrate or bicarbonate. Iodine may be provided as the iodide of sodium, magnesium or manganese. Manganese might be provided as manganous chloride, and zinc could be provided as the acetate. Still other suitable forms may also be used. However, as indicated above, the actual formulation as shown in Table I is preferred and is considered to have certain advantages.

In addition to the foregoing minerals, if it is intended to employ the diet for extended periods of time, metabolizable and nontoxic salts of cobalt and molybdenum are also included. Examples of such suitable salts include sodium, potassium, and ammonium molybdate and cobaltous acetate·$4H_2O$.

Of the foregoing minerals, it is considered important that any food composition that is designed to be the primary source of nutritional supply for a human subject should contain sodium, magnesium, potassium, iron, calcium, chloride and phosphorus in nutritionally significant amounts, which may be defined as amounts which have substantial effect on the physiological functions of the human body. The formulation illustrated in Table I includes amounts of these elements which are considered to be more than adequate in accordance with current thinking and specifications.

The order of addition of these minerals is important in order to avoid potential interreactions which might well result in precipitates that will adversely affect the solution. Magnesium oxide, which is utilized as the source of magnesium, is readily incorporated into the main solution of essential and non-essential amino acids plus carbohydrate by first being dissolved in an aqueous solution of potassium hydroxide and glucono-delta-lactone to form a pre-solution. The pre-solution in which the magnesium oxide is completely dissolved is slowly added to the main solution.

Also following the carbohydrate addition, hydrated sodium glycerophosphate is added to the solution, as is hydrated ferrous ammonium sulfate. The sodium chloride may also be conveniently added at this time. Following the dissolution of the glycerophosphate and the ferrous compounds, the remainder of the carbohydrate is dissolved in the solution, using constant stirring. The temperature of the solution may be raised slightly in order to expediate the solution of the carbohydrate but the temperature should not exceed 35° C. for reasons previously pointed out.

At this point which is approaching the end of the dissolution process, the water-soluble vitamins are added, one after another, insuring that each is dissolved before the following one is added. Adding the vitamins earlier and/or while the temperature is higher, is avoided because of the thermal susceptibility of these vitamins, particularly thiamine, for example.

The hydrated calcium chloride is added after the dissolution of the remainder of the carbohydrate. It is extremely important that all of the glycerophosphate compound is completely in solution before the addition of the calcium chloride, and moreover, the addition of the calcium should not immediately follow addition of the glycerophosphate compound because of the potential formation of a refractory precipitate of calcium glycerophosphate. It has been found that such formation of a refractory precipitate is completely avoided if the remainder of the carbohydrate, and preferably also the vitamins, are dissolved in the solution between the initial addition of the glycerophosphate compound and the subsequent dissolution of the soluble calcium compound. It is believed that the glycerophosphate is complexed in some manner by the other ions after a sufficient residence in solution.

The remaining trace minerals are preferably individually dissolved in water, and these solutions combined to form one pre-solution. This pre-solution includes the manganous salt, the cupric salt, the zinc salt and the iodide salt, plus the molybdenum and the cobalt salts if such are employed. At this point in the process, the temperature of the main solution is maintained at about 30° C. or below while the pre-solution of the trace minerals is slowly added. Particularly important is the handling of the manganous salt. It has been found that the manganous salt should not be added to the solution prior to the complete dissolution of the water-soluble iron compound, for it appears that a stable solution is not obtained if these two salts are added in the reverse order to a solution containing the amino acids and carbohydrates. It is believed that addition in the reverse order may cause oxidation of the manganous ion to manganese dioxide accompanied by the formation of undesirable precipitates. It is thought that the other ingredients in the solution may well form stable complexes with the ferrous iron if it is added sufficiently prior to the addition of the manganous iron, and accordingly the ferrous ion should preferably be dissolved in the solution prior to the second addition of carbohydrate.

Another consideration in making a nutrient composition of this type is that the growth of microorganisms, such as bacteria should be prevented. To achieve this end, from the time the temperature is lowered by the first dissolution of the carbohydrate, the amount of water present in the solution, relative to the amount of carbohydrate and solutes, is regulated so that the solution is hypertonic. For purposes of this application, hypertonic is defined as having an osmotic pressure higher than that within microorganisms so that undesirable microorganisms, for example, $E.\ coli$, cannot grow in the solution. The amounts of water added subsequently throughout the process are similarly balanced with the amounts of additional solute so that the hypertonicity of the solution is maintained, at least up to and through the addition of all the water-soluble ingredients.

Depending upon the intended use of a particular batch of the food composition, the product may be dried, as discussed more fully hereinafter, in which case the solution should remain hypertonic to and through the drying process. Also, the product might be shipped in concentrated solution to another location where it would be likely diluted before administration, in which instance there is a considerable advantage in maintaining the solution hypertonic during shipping. On the other hand, if it is the intention to package the solution in a form for immediate and simple administration it should remain hypertonic until final dilution, which would be normally carried out just shortly before a pasteurization or sterilization step that should immediately precede packaging.

At the completion of the addition of the water-soluble components, the flavoring and coloring agents desired are normally added. To provide human subjects with a choice of tastes for such a daily complete diet as this invention can provide, different flavored versions of the diet are made available. It has been found that certain flavors, particularly the citrus and other fruit flavors, are most compatible with the fair amount of sweetness imparted to the diet by high glucose content and with the other aspects of the diet. Two completely satisfactory flavors, orange and peach, have successfully undergone rigorous taste panel testing for acceptability.

At the conclusion of the addition of all of the water-soluble ingredients, an emulsion is made with the fat and fat-soluble ingredients. A suitable edible emulsifier, such as a polyoxyethylene sorbitan monooleate, is added in sufficient amount. In sequence thereafter, the fat component, followed by the fat-soluble vitamins, are individually added. With all of the ingredients in the single batch, a suitable emulsifier or homogenizer is employed to create a stable emulsion.

The fat component may be a suitable fat, i.e., a glycerol ester of a fatty acid having between 12 and 24 carbon atoms, or a fat substitute, such as a simple alkyl ester of a fatty acid having between 12 and 24 carbon atoms, the alkyl group having 6 or less carbon atoms, for example, ethyl linoleate. A purified naturally occurring fat, such as purified safflower oil or corn oil, may also be employed.

If the composition is to be packaged for immediate administration, water is added after emulsifying to increase the volume of the product to the desired dilution, followed preferably immediately by pasteurization or sterilization. Again, temperature considerations should be recognized, and pasteurization is preferably carried out by heating to a temperature of about 90° C. for about one minute, and not substantially longer, whereafter the emulsion is rapidly cooled to a temperature below about 40° C. During the time of raising the emulsion to pasteurization temperature, the time of pasteurization, and the time of cooling, the temperature should not be above about 60° C. for longer than five minutes total. It has been found that pasteurization in this particular manner achieves the intended purpose while preserving the palatability of the food composition.

If a dried product is desired, the pasteurization step need not be carried out if hypertonicity of the relatively concentrated emulsion is to be relied upon to prevent bacterial growth. It has been found that by freeze-drying this product, preferably to a moisture level or less than about 5 percent by weght, a dry product is formed which is free from bacterial growth and taste-stable during storage at room temperature. Moreover, freeze-drying produces a dried product that is easily reconstitutable to the form in which it will normally be administered, i.e., a water solution. The freeze-dried product easily re-dissolves as an aggregate, and if the product which was freeze-dried was in the form of an emulsion, an emulsion is again formed upon re-dissolution. It is considered to be definitely advantageous to be able to provide a product of this type which can be stored and/or transported in the dry form and which can be easily dissolved as an aggregate to form a palatable diet composition, especially one containing all of the daily necessary nutrients for the human species.

The following example is directed to the preparation of a complete diet formulation and is chosen to illustrate various aspects of the invention. It should be understood that this example is provided for purposes of illustration and does not constitute limitations upon the scope of the invention which is defined solely by the claims at the end of this specification.

EXAMPLE

A palatable chemically defined diet is formed in the manner described below. The amino acids are used in the form of the L-isomers thereof, with there being no substantial portion of the D-isomers of the individual amino acid. All of the amino acids employed are first recrystallized from water, or from a water-ethanol solvent mixture, in the presence of activated charcoal in order to remove potentially undesirable impurities which may contaminate the individual amino acids. The batch to be prepared will provide about 1,000 liters of a diet composition having a concentration such that each milliliter contains approximately 2.7 calories. As previously indicated, the diet is intended for actual administration in more dilute form, preferably at about one calorie per milliliter.

Before beginning the actual dissolution of the components, preparation of various pre-solutions to be used is carried out.

Into about 30 liters of distilled or deionized water, 1.71 kg. of reagent grade sodium hydroxide is initially dissolved, followed by 5.63 kg. of L-aspartic acid, employing stirring to achieve complete solution at room temperature.

Into another 30 liter quantity of distilled or deionized water, 4.06 kg. of reagent grade potassium hydroxide is dissolved. To this solution is added 17.67 kg. of glucono-delta-lactone, stirring to dissolve, followed by 385 grams of reagent grade magnesium oxide. The magnesium oxide is stirred to form an initial suspension, and stirring is continued at room temperature to accomplish complete dissolution.

Into six separate, 100 milliliter quantities of distilled or deionized water, the following quantities of salts are individually added: hydrated ammonium molybdate, 430 mg.; hydrated cobaltous acetate, 1.7 grams; hydrated cupric acetate, 2.55 grams; zinc chloride, 1.28 grams; potassium iodide, 0.255 gram; and hydrated manganous acetate, 18.3 grams. These six individual solutions are then added in sequence to 3 liters of distilled or deionized water, while stirring, to make up a composite solution which is hereafter referred to as the trace mineral pre-solution, and to which sufficient additional water is added to dilute it to 4 liters.

The batch preparation is begun by heating 400 liters of distilled or deionized water to 90° C., in a steam-jacketed kettle equipped with an efficient stirrer. The amounts of the amino acids set forth immediately herebelow are added to the water while the temperature is maintained at about 90° C.:

|  | Kg. |
| --- | --- |
| L-alanine | 2.64 |
| L-arginine·HCl | 5.84 |
| L-aspartic acid pre-solution glycine | 4.30 |
| L-1-histidine·HCl·H₂O | 1.62 |
| L-isoleucine | 2.47 |
| L-leucine | 3.92 |
| L-lysine·HCl | 3.67 |
| L-methionine | 2.54 |
| L-proline | 3.52 |
| L-serine | 1.82 |
| L-threonine | 2.47 |
| L-phenylalanine | 2.82 |
| L-tyrosine ethyl ester·HCl | 4.20 |
| L-valine | 2.73 |

Each of the ingredients is added separately and dissolved before the next is added. The methionine may be added last, so as to reduce the time during which it is exposed to the 90° C. temperature.

Upon completion of the dissolution of the last of the above named amounts of amino acids, the application of heat to the kettle is stopped, and about 400 kg. of glucose is added in a substantially continuous stream with continuous stirring. The addition of the glucose is performed sufficiently rapidly so that a temperature of about 40° C. is reached within ten minutes after the glucose addition begins. Thereafter, heat is supplied as necessary to maintain the temperature of the solution between about 30 and 35° C., while stirring is continued, until all of the gluose is dissolved.

When the glucose dissolution is completed, 770 grams of L-tryptophan are dissolved, followed by the addition of 9.29 kg. of L-glutamine after the tryptophan dissolution is complete. After the glutamine is dissolved, the glucono-delta-lactone-magnesium oxide pre-solution, which measures about 30 liters, is slowly added at a fairly constant rate over a period of five to ten minutes while stirring.

Following the addition of this pre-solution, 5:36 kg. of hydrated sodium glyceryophosphate is added, followed by 5.48 kg. of sodium chloride, and by 6.98 grams of hydrated ferrous ammonium sulfate, dissolution of each component being completed before addition of the next. At this time, about 192.5 kg. of glucose are dissolved in the solution, to make a total amount of dissolved glucose of 592.5 kg. Stirring is employed, and the temperature of the solution is maintained between and 30 and 35° C. until the dissolution of the glucose is completed.

The following USP grade vitamins are then added in this sequence, insuring that each is dissolved before the next is added: 639 grams p-amino benzoic acid, 96 grams of ascorbic acid; a pre-solution of 1.28 grams of d-biotin in distilled water; 12.8 grams of d-calcium pantothenate; 354.8 grams of choline bitartrate; 2.56 grams of folic acid; 1.28 grams of inosital; 15.36 grams of niacinamide; 2.56 grams of pyridoxine·HCl; 2.31 grams of riboflavin; 1.53 grams of thiamine·HCl; and 2.56 grams of a 1:1000 trituration of cyanocobalamin with mannitol.

Following the dissolution of the vitamins, 2.5 kg. of hydrated calcium chloride is slowly added in increments of about 250 grams. Upon complete dissolution of the hydrated calcium chloride, and with the solution at a temperature not above 30° C., the four liters of the trace minerals pre-solution is slowly added, with stirring, over a period of five minutes.

Next, the solution is given an orange flavoring and coloring by adding the following ingredients in the amounts stated, which are designed to color and flavor the 1000 liters of concentrate: 3.36 kg. of Firmenich Orange Juice Flavor No. 59.107/AP; 83.8 grams FD & C Yellow No. 5; 50 grams FD & C Yellow No. 6; and 16.8 kg. of citric acid.

To the colored and flavored aqueous solution are added in sequence: 100 grams of Polysorbate 80 emulsifier; 2 kg. of pure ethyl linoleate; 3.64 grams of Vitamin A acetate; 5.73 grams of alpha-tocopherol acetate; 4.58 grams of menadione; and 57 mg. of Vitamin D. All of the vitamins employed meet USP standards. The solution with the fat and the fat-soluble vitamins added thereto is then homogenized at room temperature for a sufficient time to create a uniform emulsion of the fat phase and the liquid phase. Additional distilled or deionized water is employed to wash the homogenization apparatus and make certain of the quantitative use of the diet composition. This water is added to the emulsion. About 200 to 300 liters of water can be used for this purpose and subsequently added to the main batch in order to end up with a final volume of about 1000 liters.

As previously indicated, the 1000 liters of product may be packaged in this relatively concentrated form, or may be diluted further with water prior to packaging. The emulsion is pasteurized by passage through a heat exchange-type pasteurizer at a rate so that the emulsion is exposed to a temperature of about 90° C. for about one minute. The product exiting from the pasteurizer is cooled using a suitable cooling device employing tap water. The pasteurization treatment is such that the emulsion is exposed to a temperature of about 60° C. or higher for no longer than a total of five minutes. The product from the pasteurizer is conducted directly to canning apparatus wherein it is filled into ordinary cans in a manner usual for the food processing industry. After canning, the product can be stored at room temperature for months prior to administration without adverse affect.

A sample of the canned product is subjected to taste-testing. The product has a pleasant orange taste and a comparable orange color; it is considered to be quite palatable for human taste.

If the process conditions are not closely controlled, unpalatability in the ultimate product can result from a variety of reasons. For example, exposure of the methionine component to temperatures above 90° C. for substantial periods of time results in the thermal degradation of the methionine with the consequent production of methyl mercaptan, and an amount of methyl mercaptan exceeding the relatively low limit of 15 milligrams per liter may be produced. On the other hand, as previously mentioned, exposure of an aqueous solution containing amino acids plus carbohydrates, such as glucose, having aldehyde groups may result both in caramelization and in other reactions with the more reactive amino acids, such as tryptophan, that may ruin palatability. As also pointed out, an indiscriminate sequence of addition of the minerals into an aqueous solution of this type containing amino acids and carbohydrates can quite easily result in undesirable precipitates being formed.

In general, the present invention provides processes for the production of nutritionally adequate nutrient compositions composed entirely of amino acids, carbohydrates, fats, vitamins and salts which are palatable to the human taste and which, by virtue of their relatively simple chemical nature, are able to bypass all digestive functions. Modifications as would be obvious to one having the ordinary skill in the art may be made without departing from the principles and spirit of the invention. For example, although the description has been primarily directed to the production of such palatable nutrient compositions from starting materials in the form of crystallized individual amino acids, various of the features of the invention are also applicable to the provision of diets wherein the amino acids are obtained in groups from protein hydrolysates, as for example those parts of the process wherein the minerals, carbohydrates, vitamins and fats are incorporated with an amino acid aqueous solution.

Various features of the invention are set forth in the following claims.

What is claimed is:

1. A process for making a palatable aqueous solution for human consumption containing all of the essential amino acids, which process comprises dissolving the following essential amino acids: lysine, leucine, isoleucine, valine, phenylalanine, arginine, histidine, methionine, and threonine, the ratios of the levels of the amino acids being balanced, generally as found in a high quality protein such as meat, eggs or milk, into water at a temperature of about 90 to 100° C. to form a main solution, said methionine containing methyl mercaptan in an amount less than that which would provide a level greater than 15 mg. per liter of the ultimate palatable solution, lowering the temperature of said main solution by the dissolution of carbohydrate selected from the group consisting of monosaccharides, disaccharides, starches, dextrins and mixtures thereof at an initial rate at least sufficient to rapidly lower the temperature of said main solution to 40° C. in about 10 minutes and thereby avoid any substantial interaction between said carbohydrate and said amino acids, and then adding tryptophan in an amount sufficient to provide a palatable, nutritionally balanced solution.

2. The process in accordance with claim 1 wherein aspartic acid is dissolved in alkaline water having a pH between about 8 and 14 and then added to said 90 to 100° C. water.

3. The process in accordance with claim 1 wherein glutamine is dissolved in said main solution after said temperature lowering is completed.

4. The process in accordance with claim 2 wherein the following amino acids are dissolved in said 90 to 100° C. water prior to said temperature lowering: alanine, proline, glycine, serine, and tyrosine.

5. The process in accordance with claim 1 wherein said lowering of said temperature is accomplished at least in part by the dissolution of a carbohydrate selected from the group consisting of glucose, maltose, starches, dextrin and mixtures thereof.

6. The process in accordance with claim 5 wherein glucose is employed as at least the major portion of said carbohydrate.

7. The process in accordance with claim 1 wherein a water-soluble glycerophosphate compound is dissolved in said main solution subsequent to said carbohydrate dissolution.

8. The process in accordance with claim 7 wherein a water-soluble calcium compound selected from the group consisting of calcium chloride, calcium acetate, calcium citrate, calcium bicarbonate, and mixtures thereof is dissolved in said main solution subsequent to the complete dissolution of said glycerophosphate.

9. The process in accordance with claim 8 wherein an additional amount of a carbohydrate selected from the group consisting of glucose, maltose, starches, dextrines and mixtures thereof is dissolved in said main solution while maintaining the temperature thereof at about 35° C. or below, subsequent to the dissolution of said glycerophosphate but prior to the dissolution of said calcium compound.

10. The process in accordance with claim 9 wherein water-soluble iron selected from the group consisting of ferrous chloride, ferrous gluconate, ferrous ammonium sulfate, ferrous acetate, ferrous citrate and mixtures thereof is dissolved in said main solution subsequent to dissolution of said carbohydrate.

11. The process in accordance with claim 10 wherein an aqueous solution of a manganese compound selected from the group consisting of manganous acetate, manganous chloride, manganous iodide and mixtures thereof is added to said main solution subsequent to said dissolution of said iron and while said main solution is at a temperature of about 35° C. or below to obtain a stable solution by avoiding interaction between the ferrous ion and the manganous ion.

12. The process in accordance with claim 11 wherein a separate aqueous solution including potassium hydroxide and magnesium oxide is added to said main solution after dissolution of said carbohydrate.

13. The process in accordance with claim 11 wherein subsequent to said dissolution of said calcium compound, an aqueous solution of compounds containing the following ions is added to said main solution: the cupric ion, the zinc ion and the iodide ion, while maintaining the temperature of said main solution at about 30° C. or below.

14. The process in accordance with claim 11 wherein the following water-soluble vitamins are added to said main solution subsequent to the second dissolution of said carbohydrate: p-amino-benzoic acid, ascorbic acid, d-biotin, d-calcium pantothenate, choline chloride, folic acid, inositol, niacinamide, pyridoxine, riboflavin, thamine and cyanocobalamin.

15. The process in accordance with claim 14 wherein said main solution is made into an emulsion with an edible fat component, vitamins A and D, menadione and a fat-soluble tocopheral compound using an edible emulsifier.

16. The process in accordance with claim 15 wherein said fat component is purified safflower oil or corn oil or a glyceryl ester or an alkyl ester of fatty acids having between 12 and 24 carbon atoms, said alkyl group having between 1 and 6 carbon atoms.

17. The process in accordance with claim 15 wherein the temperature of said main solution from the time of addition of methionine to said time of emulsification is maintained sufficiently low to prevent the creation of methyl mercaptan in an amount higher about 15 mg. per liter of ultimate solution.

18. The process in accordance with claim 13 wherein said main solution is limited in the amount of water contained therein so that it is hypertonic subsequent to the first dissolution of said carbohydrate and until the completion of said emulsification.

19. The process n accordance wih claim 15 wherein said emulsion is pasteurized by heating to a temperature of about 90° C. for a time not longer than about one minute, whereafter said emulsion is rapidly cooled to a temperature below about 40° C., said emulsion being above about 60° C. not longer than about five minutes.

20. The process in accordance with claim 15 wherein said emulsion is dried to a moisture level of not greater than about 5 percent by weight using freeze-drying.

21. A process for making a palatable aqueous solution for human consumption containing all of the essential amino acids, which process comprises dissolving the following essential amino acids: lysine, leucine, isoleucine, valine, phenylalanine, arginine, hisidine, methionine, and threonine, the ratios of the levels of the amino acids being balanced generally as found in a high quality protein such as meat, eggs or milk, into water at a temperature of about 90 to 100° C. to form a main solution, said methionine containing methyl mercaptan in an amount less than that which would provide a level greater than 15 mg. per liter of the ultimate palatable solution, dissolving aspartic acid in alkaline water having a pH between about 8 and 14, adding said aspartic acid solution to said main solution, lowering the temperature of said main solution by the dissolution of carbohydrate selected from the group consisting of monosaccharides, disaccharides, starches, dextrins and mixtures thereof to between about 70 to 30° C. and then adding tryptophan in an amount sufficient to provide a palatable, nutritionally balanced solution.

22. The process in accordance with claim 21 wherein glutamine is dissolved in said main solution after said temperature lowering is completed.

23. The invention in accordance with claim 21 wherein the following amino acids are dissolved in said 90 to 100° C. water prior to said temperature lowering: alanine, proline, glycine, serine, and tyrosine.

24. The invention in accordance with claim 21 wherein a water-soluble glycerophosphate compound is dissolved in said main solution subsequent to said carbohydrate dissolution.

25. The invention in accordance with claim 24 wherein a water-soluble calcium compound selected from the group consisting of calcium chloride, calcium acetate, calcium citrate, calcium bicarbonate, and mixtures thereof is dissolved in said main solution subsequent to the complete dissolution of said glycerophosphate.

26. The invention in accordance with claim 25 wherein an additional amount of a carbohydrate selected from the group consisting of glucose, maltose, starches, dextrins and mixtures thereof is dissolved in said main solution while maintaining the temperature thereof at about 35° C. or below, subsequent to the dissolution of said glycerophosphate but prior to the dissolution of said calcium compound.

27. The invention in accordance with claim 21 wherein water-soluble iron selected from the group consisting of ferrous chloride, ferrous gluconate, ferrous ammonium sulfate, ferrous acetate, ferrous citrate and mixtures thereof is dissolved in said main solution subsequent to dissolution of said carbohydrate.

28. The invention in accordance with claim 27 wherein an aqueous solution of a manganese compound selected from the group consisting of manganous acetate, manganous chloride, manganous iodide and mixtures thereof is added to said main solution subsequent to said dissolution of said iron and while said main solution is at a temperature of about 35° C. or below to obtain a stable solution by avoiding interaction between the ferrous ion and the manganous ion.

29. A process in accordance with claim 28 wherein additional carbohydrate selected from the group consisting of monosaccharides, disaccharides, starches, dextrins and mixtures thereof is dissolved in said solution subsequent to the addition of said iron compound and prior to the addition of said manganese compound.

References Cited
UNITED STATES PATENTS 2,872,319   2/1959   Wretlind _____ 99—14

RAYMOND N. JONES, Primary Examiner

R. B. ANDEWELT, Assistant Examiner

U.S. Cl. X.R.

99—11, 14, 28; 424—319